(12) United States Patent
Hung

(10) Patent No.: US 6,538,901 B1
(45) Date of Patent: Mar. 25, 2003

(54) OPTICAL TRANSCEIVER MODULE

(76) Inventor: Chen-Hung Hung, P.O. Box 54-134, Taipei (TW)

( * ) Notice: Subject to any disclaimer, the term of this patent is extended or adjusted under 35 U.S.C. 154(b) by 0 days.

(21) Appl. No.: 10/090,568

(22) Filed: Mar. 5, 2002

(51) Int. Cl.[7] .............................. G11C 11/00; G02B 6/36
(52) U.S. Cl. ................................................ 361/806; 385/92
(58) Field of Search ................................ 361/806, 752; 385/88, 91, 92, 93; 257/113, 116, 79–82

(56) References Cited

U.S. PATENT DOCUMENTS

| | | | | |
|---|---|---|---|---|
| 4,385,797 A | * | 5/1983 | Dubois et al. | 385/92 |
| 4,386,821 A | * | 6/1983 | Simon et al. | 385/92 |
| 5,216,730 A | * | 6/1993 | Demeritt et al. | 385/92 |
| 5,247,530 A | * | 9/1993 | Shigeno et al. | 385/92 |
| 5,537,503 A | * | 7/1996 | Tojo et al. | 385/93 |
| 5,666,450 A | * | 9/1997 | Fujimura et al. | 385/93 |
| 5,940,563 A | * | 8/1999 | Kobayashi et al. | 385/92 |
| 5,963,696 A | * | 10/1999 | Yoshida et al. | 385/91 |
| 6,035,664 A | * | 3/2000 | Hasizume | 65/36 |
| 6,059,463 A | * | 5/2000 | Althaus et al. | 385/92 |
| 6,072,814 A | * | 6/2000 | Ryan et al. | 372/35 |
| 6,092,935 A | * | 7/2000 | Althaus et al. | 385/93 |
| 6,283,644 B1 | * | 9/2001 | Gilliland et al. | 385/93 |
| 6,334,716 B1 | * | 1/2002 | Ojima et al. | 385/89 |

* cited by examiner

*Primary Examiner*—David Martin
*Assistant Examiner*—Phuong T. Vu
(74) *Attorney, Agent, or Firm*—Troxell Law Office PLLC

(57) ABSTRACT

An optical transceiver module includes a body and an optical transceiver unit. The body includes a seat, a mini head cover coaxially arranged within the seat, and a tubular sleeve coaxially engaged to the seat. The optical transceiver unit includes a retaining seat, a light receiving or emitting module coaxially arranged within the retaining seat. The focus of the optical transceiver module is calibrated by proprietarily tools and then is welded with the body by laser welding. The components of the optical transceiver module are very simple. The cost can be reduced. The error is smaller and precision is high. The volume is small and thus the optical transceiver module can be used in different module.

1 Claim, 2 Drawing Sheets

OPTICAL TRANSCEIVER MODULE

FIELD OF THE INVENTION

The present invention relates to an optical transceiver module, and particularly to an optical transceiver module which has a smaller volume and can be used in various specifications. Therefore, the present invention has a simple structure and the error can be reduced so that the coupling efficiency can be reduced greatly.

BACKGROUND OF THE INVENTION

Currently laser diodes are used in optical communication system as light sources. The laser diodes are packaged as a laser diode element, as illustrated in FIG. 1. The laser diode element 1 is installed at one end of a metal base 2 and is fixed by a fixing glue 3. Another end of the metal base 2 is combined with a hollow sleeve 4. The interior of the hollow sleeve 4 is coaxially installed with an engaging element 5; a hollow ceramic tube 6, and a round ceramic head cover 7. The distal end of the head cover 7 is ground as a title surface 8 so that reflecting light reflects to the laser diodes directly and thereby, the laser diodes are interfered by noises. The interior of the head cover 7 is coaxially arranged with an optical fiber 9 so that the light emitted from the laser diode element 1 exactly collects upon the central shaft of the optical fiber 9. Then the light into the optical fiber 9 is guided to the central shaft of the optical fiber joint. The head cover 7; ceramic tube 6, engaging element 5, sleeve 4 and seat 2 are combined by rivets.

About components form a light emitting module. Similarly, if the laser diode element 1 is a detecting element. Then it forms as a light receiving module. The optical transceiver module can be used after packaged. However, this prior art has the following disadvantages:

1. It is formed by a plurality of elements, thus the assembly work is difficult and the cost is high.
2. The head cover, ceramic tube, engaging element, sleeve and seat are riveted, however, the error of rivets is larger.
3. It has a larger volume and can not be made as a compact component.

SUMMARY OF THE INVENTION

Accordingly, the primary object of the present invention is to provide an optical transceiver module includes a body and an optical transceiver unit. The body includes a seat, a mini head cover coaxially arranged within the seat, and a tubular sleeve coaxially engaged to the seat. The optical transceiver unit includes a retaining seat, a light receiving or emitting module coaxially arranged within the retaining seat. The focus of the optical transceiver module is calibrated by proprietarily tools and then is welded with the body by laser welding. The components of the optical transceiver module are very simple. The cost can be reduced. The error is smaller and precision is high. The volume is small and thus the optical transceiver module can be used in different module.

The various objects and advantages of the present invention will be more readily understood from the following detailed description when read in conjunction with the appended drawing.

DETAILED DESCRIPTION OF THE PREFERRED EMBODIMENTS

Figures 1, 2:
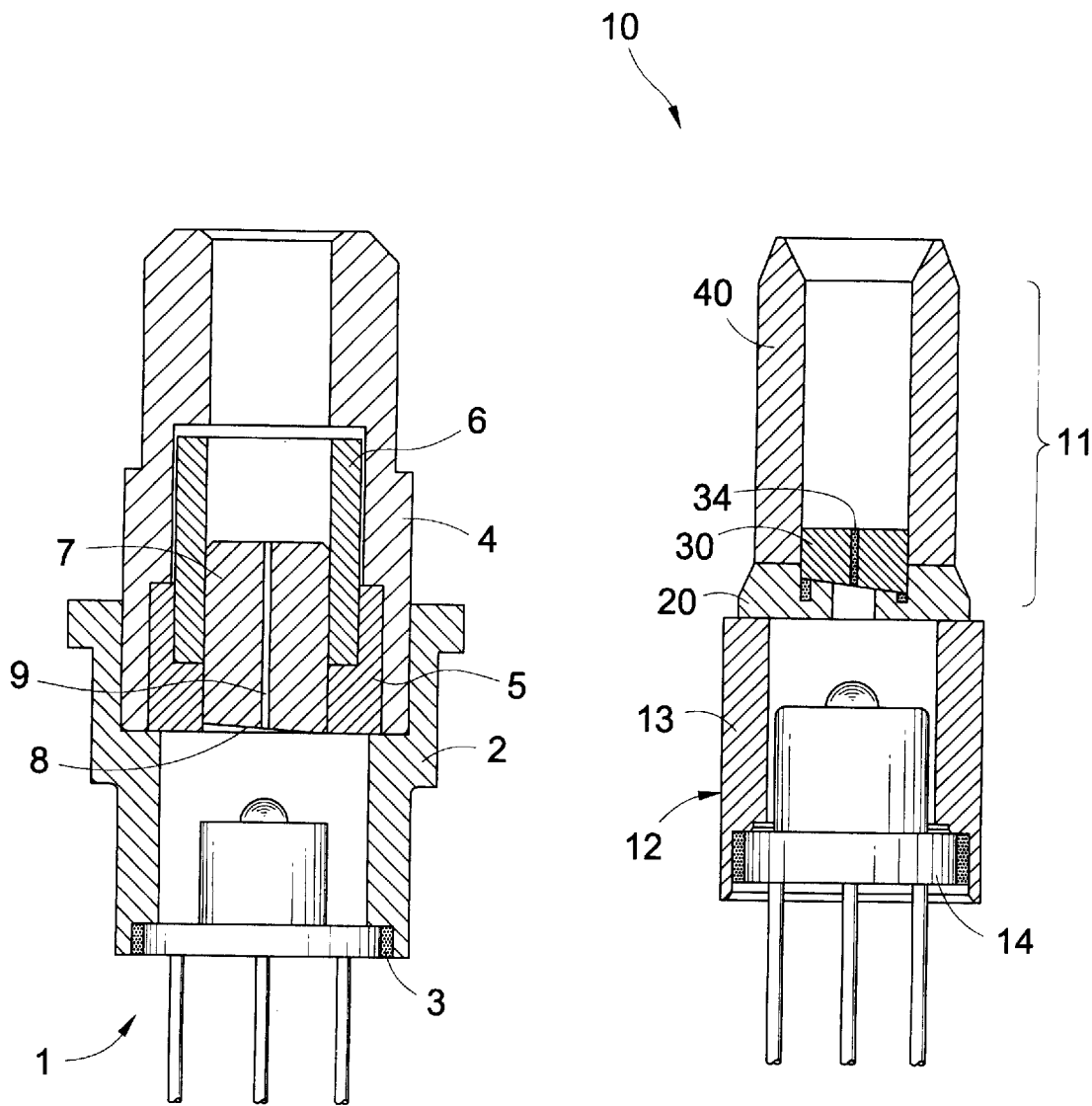
FIG. 1 is a cross sectional view of an optical transceiver module of the prior art.
FIG. 2 is a cross sectional view of the optical transceiver module of the present invention.
Figure 3:
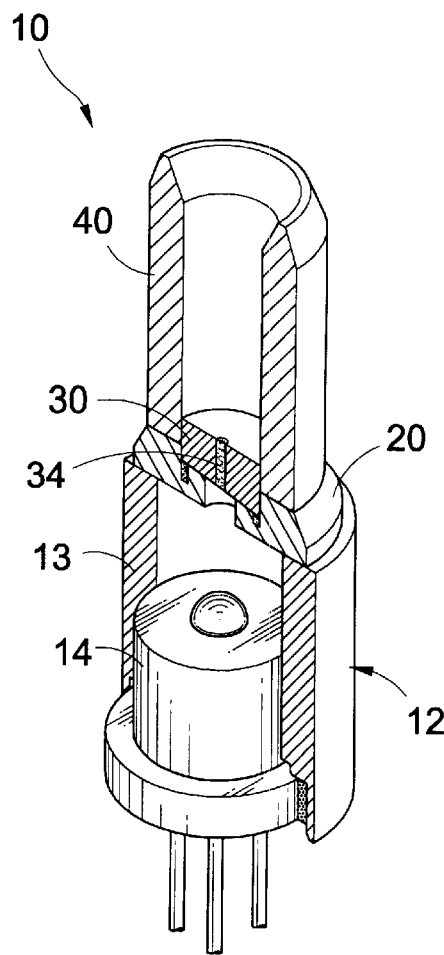
FIG. 3 is a perspective view of the optical transceiver module of the present invention.

Referring to FIGS. 2 and 3, the optical transceiver module 10 of the present invention is illustrated. The optical transceiver module 10 includes a body 11 and an optical transceiver unit 12. The body 11 includes a seat 20, a mini head cover 30 coaxially arranged within the seat 20, and a tubular sleeve 40 coaxially engaged to the seat 20. The optical transceiver unit 12 includes a retaining seat 13, a light receiving or emitting module 14 coaxially arranged within the retaining seat 13. The focus of the optical transceiver module 12 is calibrated by proprietarily tools and then is welded with the body 11 by laser welding.

Figure 4:
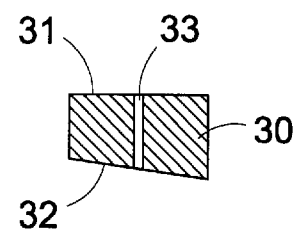
FIG. 4 is a cross sectional view of the seat of the present invention.

FIG. 4 shows a cross sectional view which illustrates one example of the mini head cover. The mini head cover 30 is made of ceramic material and has a font surface 31 and a rear surface 32 which are opposite to one another. An axial hole 33 extends between the font surface 31 and rear surface 32 for receiving an optical fiber 34 so that light can be coupled to the axial central tube of the optical filler 34. The rear surface 32 is an inclined plane for preventing reflecting light from radiating to the laser diode so that the laser diode is interfered. According to current machining work, the height of the mini-head cover (the length from the font surface 31 to the rear surface 32) is made as 2 mm. Therefore, the overall length of the body 11 can be reduced greatly so as to be used in various fields.

Figure 5:
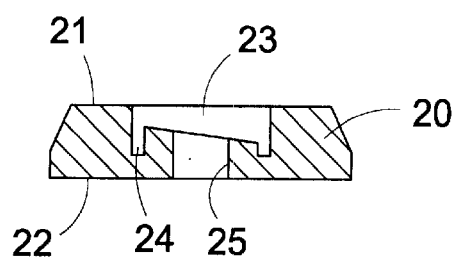
FIG. 5 is a cross sectional view of the mini head cover of the present invention.

The seat 20 illustrates in FIG. 5 showing an embodiment of the seat 20. The seat 20 is made of metal material. The font surface 31 is opposite to the rear surface 32. The font surface 21 has an annular hole 23 for receiving the mini head cover 30. A bottom of the annular hole 23 is an inclined plane corresponding to the rear surface 32. The interior of the annular hole 23 has a recess 24. Thereby, glue can be filled into a slot 24, thereby; the mini head cover 30 is fixed to the seat 20. The rear surface 32 has a hole 25 which is communicated to the annular hole 23. The hole may pass through by receiving transmitting light source.

Figure 6:
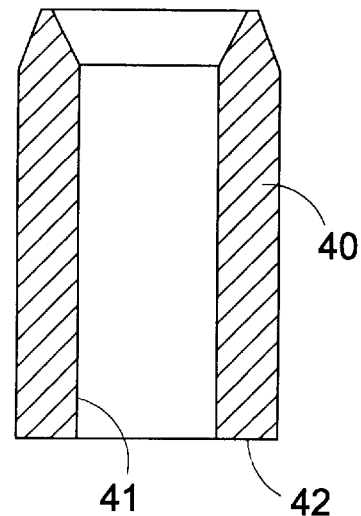
FIG. 6 is a cross sectional view of the body of the present invention.

FIG. 6 is a cross sectional view showing one embodiment of the tubular sleeve 40. The tubular sleeve 40 is made of metal material. The internal thereof has an inserting hole 41 for being inserted by a joint of the optical fiber for transmission light. The precision of the inserting hole 41 may be controlled to be between $\phi 2.500$ mm to $\phi 2.501$ mm for receiving an optical fiber of $\phi 2.4995$ mm. Thereby, the end surface of an optical fiber, joint has a preferred connection with the end surface of the optical fiber 34 for improving the alignment of the system. The sleeve 40 of the seat 20 is jointed by the retaining seat 13 by laser welding.

The optical transceiver module 10 can be packaged in a plastic body for being used by an optical fiber joint. Therefore, the receiving or emitting light of the light receiving or emitting module 14 is exactly collected or coupled to the axial central shaft of the optical fiber 34 of the mini head cover. Then the light is collected and coupled to the central shaft of the optical fiber joint.

The optical transceiver module of the present invention has the following advantages:

1. The seat, sleeve, and retaining seat are combined by laser welding so as to have a preferred reliability and stability.
2. The parts necessary is reduced and thus the assembly work is simple, quick and the cost necessary is low.
3. The error is smaller so that the precision can be well controlled.
4. The volume is small and can be used in various fields. Thereby, the present invention has a preferred coupled efficiency.

The present invention is thus described; it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An optical transceiver module comprising a body and an optical transceiver unit; the focus of the optical transceiver unit being calibrated by proprietary tools and then being combined with the body; the optical transceiver unit having a retaining seat, and a light receiving or emitting module coaxially arranged within the retaining seat; characterized in that:

the body includes a mini head cover, a seat, and a tubular sleeve; wherein the mini head cover is made of ceramic material and has a front surface and a rear surface which are opposite to one another; an axial hole extends between the front surface and rear surface for receiving an optical fiber so that light is coupled to the axial central tube of the optical fiber; a rear surface is an inclined plane for preventing reflecting light from radiating to a laser diode so that the laser diode is interfered;

the seat is made of metal material; a front surface is opposite to the rear surface; a front surface has an annular hole for receiving the mini head cover; a bottom of the annular hole is an inclined plane corresponding to the rear surface; an interior of the annular hole has a recess; thereby, glue is filled into a slot, thereby, the mini head cover being fixed to the seat; the rear surface has a hole which is communicated to the annular hole; light passes through the annular hole; and the tubular sleeve is made of metal material; an internal thereof has an inserting hole for being inserted by a joint of the optical fiber for transmission light.

* * * * *